United States Patent [19]

Fujimori et al.

[11] 4,298,460

[45] Nov. 3, 1981

[54] PROCESS FOR PROCESSING SULFUR-CONTAINING HEAVY OIL

[75] Inventors: Kuniaki Fujimori, Tokyo; Teruo Suzuka, Kawaguchi; Yukio Inoue, Urawa; Shirou Aizawa, Toda, all of Japan

[73] Assignee: Nippon Mining Company, Limited, Tokyo, Japan

[21] Appl. No.: 133,082

[22] Filed: Mar. 24, 1980

[30] Foreign Application Priority Data

Mar. 22, 1979 [JP] Japan .................................. 54-33670

[51] Int. Cl.$^3$ ...................... C10G 11/02; C10G 11/18
[52] U.S. Cl. .................................... 208/121; 208/124; 208/244; 252/459; 252/466 J; 423/148; 423/658
[58] Field of Search ..................... 208/121, 106–124, 208/67, 208, 217, 244, 255; 252/459, 466 J

[56] References Cited

U.S. PATENT DOCUMENTS 4,224,140  9/1980  Fujimori et al. .................... 208/124

Primary Examiner—Delbert E. Gantz
Assistant Examiner—G. E. Schmitkons
Attorney, Agent, or Firm—Sughrue, Mion, Zinn, Macpeak & Seas

[57] ABSTRACT

A process for processing a sulfur-containing heavy oil, which comprises:

in a first zone, catalytically cracking a sulfur-containing heavy oil in the presence of fluidized catalyst particles containing about 30 to 60 wt % Fe to thereby convert the heavy oil to a light oil, deposit sulfur-containing coke on the catalyst particles, and partially fixing the decomposed sulfur compounds with the reduced iron contained in the catalyst particles as iron sulfide;

in a second zone, contacting the catalyst from the first zone with an oxygen containing gas in an amount less than that theoretically required to thereby partially combust the coke on the catalyst, reduce the iron in the catalyst, and fix the sulfur compounds contained in the coke as iron sulfide; and in a third zone, contacting the reduced catalyst from the second zone with steam in a fluidized manner to produce hydrogen and hydrogen sulfide and to convert the reduced iron and iron sulfide in the catalyst to iron oxides, with the iron oxide-containing catalyst obtained in the third zone being recirculated into the second zone to be reduced and a part of the reduced-state catalyst obtained in the second zone being recirculated into the first zone.

11 Claims, 1 Drawing Figure

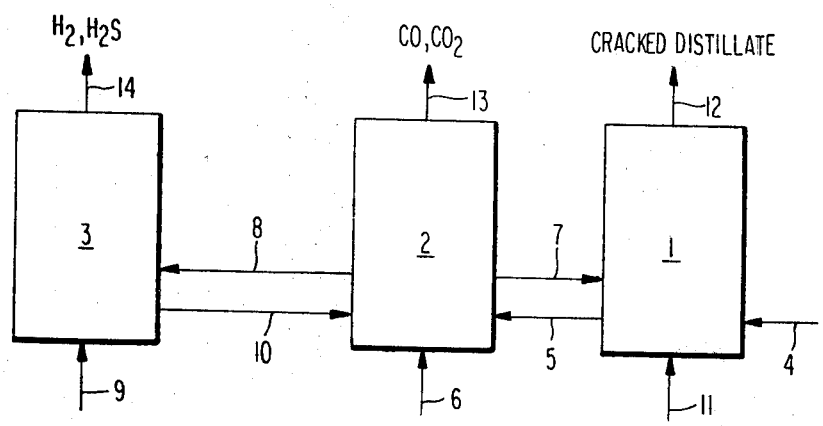

PROCESS FOR PROCESSING SULFUR-CONTAINING HEAVY OIL

BACKGROUND OF THE INVENTION

1. Field of the Invention

This invention relates to a process for producing a cracked distillate and hydrogen from a sulfur-containing heavy oil.

2. Description of the Prior Art

In recent years, processing heavy oils, in particular vacuum residual oil, has become a serious problem in petroleum refineries due to the tendency of crude oils to be heavier and the decreasing demand of power-plants, etc. for heavy oil. In addition, restrictions on the discharge of sulfur oxides and nitrogen oxides are becoming more strict year by year and the demand for low-sulfur light oil is on the rise.

Heretofore, a coking process, a partial combustion process and a combination process of coking and partial combustion have been employed industrially for processing a sulfur-containing oil. The coking process which is so-called as "EUREKA process" is described in The Japan Petroleum Institute ed., *Process Handbook*, "Thermal-Cracking-KUREHA", (78/2) A; the partial combustion process so-called as "Shell gasification/desulfurization process" is described in ibid., "Gasification-SIRM", (73/12) A; and the combination process of coking and partial combustion so-called as "flexicoking process" is described in ibid., "Thermal Cracking-ERE", (73/12) A, respectively. However, the coke obtained from coking contains sulfur components and heavy metals in such large amounts that it finds only limited application, whereas partial combustion involves problems in terms of the materials from which the apparatus is constructed because conbustion is conducted at temperatures as high as 1,300° C. and higher and, in addition, an additional oxygen plant is required to provide the high oxygen concentrations. Further, the combination process of coking and partial combustion involves problems in terms of the materials from which the apparatus is constructed because combustion is conducted at temperatures as high as 950° C. and higher.

A process has also been proposed using limestone or dolomite as a desulfurizing agent and a heat transfer medium to thereby crack heavy oils and conduct desulfurization at elevated temperatures (see Japanese Patent Publication No. 27443/76). However, the presence of alkali salts at elevated temperatures imposes the problem of selecting special materials for the apparatus.

A process has been proposed for catalytically cracking heavy oil using laterite or a laterite-containing catalyst, subjecting the resulting coke-laden catalyst to reduction processing, and contacting the catalyst with steam to produce a hydrogen-rich gas. As a result of further investigating this process, it has been discovered that:

(1) Gaseous sulfur compounds produced upon cracking a heavy sulfur-containing oil with a catalyst containing iron as a major component are fixed in the form of iron sulfide upon reacting with reduced iron which is produced when combusting the coke deposited on the catalyst with oxygen in an amount less than the amount theoretically required.

(2) When contacted with steam, reduced iron having fixed thereto iron sulfide produces hydrogen and, at the same time, iron sulfide is converted to iron oxides, with the production of hydrogen sulfide.

(3) When a high-sulfur heavy oil is catalytically cracked using a reduced catalyst, the amount of sulfur compounds in the cracked distillate decreases.

(4) The amount of hydrogen can be easily controlled by feeding an auxiliary fuel into the partial combustion zone and adjusting the feed amount.

SUMMARY OF THE INVENTION

Thus, one object of the present invention is to provide a process for processing sulfur-containing heavy oils, which comprises catalytically cracking the sulfur-containing heavy oil to produce a cracked distillate and hydrogen wherein (i) sulfur compounds in the heavy oil are captured as iron sulfide and in the coke deposited on the catalyst, (ii) it is prevented that sulfur compounds in a low concentration are released together with the combustion exhaust gas when partially combusting the coke, and (iii) the sulfur content thus captured is generated as hydrogen sulfide in a high concentration which is then absorbed and separated and then recovered easily as molten sulfur by the Clauss process. In this process catalytic cracking is conducted in the presence of a catalyst containing iron as a major component utilizing an oxidation-reduction reaction with iron to produce highly concentrated hydrogen.

Another object of the present invention is to provide a process which reduces the amount of hydrogen consumed in subsequent desulfurization steps by reducing the amount of sulfur compounds in the cracked distillate and which enables one to control the amount of hydrogen produced.

Thus, the present invention provides a process for processing a sulfur-containing heavy oil, which comprises:

in a first zone, catalytically cracking a sulfur-containing heavy oil in the presence of fluidized catalyst particles containing about 30 to 60 wt % Fe to thereby convert the heavy oil to a light oil, deposit sulfur-containing coke on the catalyst particles, and partially fixing the decomposed sulfur compounds with the reduced iron contained in the catalyst particles as iron sulfide;

in a second zone, contacting the catalyst from the first zone with an oxygen containing gas in an amount less than that theoretically required to thereby partially combust the coke on the catalyst, reduce the iron in the catalyst, and fix the sulfur compounds contained in the coke as iron sulfide; and in a third zone, contacting the reduced catalyst from the second zone with steam in a fluidized manner to produce hydrogen and hydrogen sulfide and to convert the reduced iron and iron sulfide in the catalyst to iron oxides, with the iron oxide-containing catalyst obtained in the third zone being recirculated into the second zone to be reduced and a part of the reduced-state catalyst obtained in the second zone being recirculated into the first zone.

The present invention will be described in more detail below.

BRIEF DESCRIPTION OF THE DRAWING

The FIGURE is a schematic view illustrating an apparatus for practicing the process of the present invention.

DETAILED DESCRIPTION OF THE INVENTION

The catalyst used in the present invention must contain iron in an amount of about 30 to 60 wt % as Fe. If the content of Fe is less than about 30%, the ability of the reduced iron to fix the sulfur compounds becomes insufficient and the amount of hydrogen produced by the reaction between reduced iron and steam in the above-mentioned third zone tends to decrease. On the other hand, if the Fe content exceeds about 60%, there is adhesion of catalyst particles or so-called "bogging" tends to take place in the second zone. Therefore, a process for preventing such defect is required.

The term "reduced iron" used herein includes Fe and iron suboxides. In other words, Fe in the catalyst is in a state of mixture of Fe, FeO, $Fe_3O_4$ and $Fe_2O_3$. The reduced iron in the present invention mainly means Fe but means also FeO and $Fe_3O_4$. Further, the reduced catalyst referred to in the present invention does mean an iron catalyst having the above-mentioned state and having a reduction rate expressed by the following equation of at least 11.1%.

$$\left[1 - \frac{\text{gram-atoms of } O_2 \text{ which Fe in the catalyst possesses}}{3/2 \times (\text{gram-atoms of Fe in the catalyst})}\right] \times 100$$

Of course, the reaction in the above-mentioned third zone between steam and the reduced catalyst is not necessarily carried out such that the reduction rate becomes 11.1% or less but may be effected if any difference in the reduction rate of catalyst between the second zone and the third zone is present.

As the starting material for the catalyst, natural iron ores containing about 30 wt % or more Fe such as laterite, siderite, magnetite, hematite, limonite, etc., and mixtures thereof; a mixture thereof with inorganic refractory materials such as silica, alumina, magnesia, etc.; iron compounds such as iron chloride, iron oxide, iron sulfate, iron carbonate, etc., and a mixture thereof with the above-described natural ores and refractories, etc. can be used. Of these compounds, the natural ores are preferred due to their inexpensiveness, and laterite is particularly preferable due to the ease with which the catalyst is prepared.

These catalyst materials are pulverized, granulated, and dried, followed by calcining in air at about 900 to 1,200° C. to impart the necessary hardness thereto. In this step, the above-described various iron compounds are substantially converted to iron oxides. It may of course be considered to conduct the above-described calcination in a reduction atmosphere, however, this is not so preferable because the reduced iron sinters which reduces the surface area and results in deterioration of the cracking ability of the catalyst, and adhesion of the catalyst particles occurs.

The process according to the present invention is carried out in a state of fluidized bed, thus it is desired that the catalyst used has a mean particle size of about 60 to 600 microns.

In the cracking of the heavy oil in the first zone, a WHSV (weight hourly space velocity) of the heavy oil is about 0.1 to 10, preferably 0.3 to 5. Incidentally, the amount of the coke deposited on the catalyst increases as the catalytically cracking proceeds, but in the present invention, it is desired that such amount is controlled within a range of about 2 to 15 % by weight, preferably 2 to 8% by weight based on the weight of the catalyst. If the amount of the coke deposited on the catalyst is too small, the reduction of iron oxides in the second zone does not proceed sufficiently, whereas if it is too high, then the activity of catalyst decreases and fixation of gaseous sulfur compounds becomes inferior. The amount of the coke deposited can be controlled by the amount of the catalyst circulated into the first zone, the amount of Conradon's carbon in the heavy oil and the like.

In combusting the coke on the catalyst in the second zone of the process of the present invention using an oxygen-containing gas, the lower the $O_2/C$ molar ratio is, the more reduction of the iron in the catalyst proceeds. Therefore, it is necessary to limit the oxygen-containing gas to less than the theoretical amount (as oxygen) required to oxidize the coke. On the other hand, if the above-described molar ratio is too low, the coke becomes insufficiently gasified and removed, and there is a tendency to decrease the quantity of heat generated within the second zone. Accordingly, the amount of oxygen-containing gas for the above-described partial combustion of coke is controlled so that the $O_2/C$ molar ratio is about 0.2 to 0.6 depending on the kind of catalyst particles, the iron content, and the amount of coke deposited. Additionally, an auxiliary fuel such as a heavy oil may be directly introduced into the second zone to furnish heat for the first and third zones or improve the reduction ratio of the catalyst and, as a result, increase the amount of hydrogen in the third zone.

The reaction between iron sulfide and steam in the third zone of the process of the present invention is:

$3FeS + 4H_2O \rightarrow Fe_3O_4 + 3H_2S + H_2$

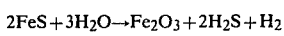

$2FeS + 3H_2O \rightarrow Fe_2O_3 + 2H_2S + H_2$

This reaction proceeds further as the $H_2O/FeS$ molar ratio increases. It is preferable to introduce 3 mols or more $H_2O$ per mol of FeS into the reactor. On this occasion, reaction between reduced iron and steam simultaneously takes place. The higher the temperature, the faster the reaction proceeds, however, when the temperature reaches 850° C. or higher, reaction between coke deposited on the catalyst and steam proceeds with generation of CO and $CO_2$ gases and a decrease in the hydrogen concentration, thus such temperatures are not preferred. Preferred reaction temperatures are about 600° to 850° C.

The flow amount of catalyst between the first and second towers is adjusted with the amount of coke deposited on the catalyst and the quantity of heat consumed in the first tower and the like. Further, the flow amount of catalyst between the second and third towers is optionally selected depending upon the amount of hydrogen generated and the degree of decomposition of iron sulfide.

The procedures of the process of the present invention will be described below by reference to the attached figure.

The attached figure is a schematic view illustrating an apparatus for practicing the process of the present invention.

The apparatus is constructed of a first tower (1) for catalytically cracking the feed oil, a second tower (2)

for partially combusting coke on the catalyst and reducing the iron in the catalyst, and a third tower (3) for contacting the reduced catalyst with steam to produce hydrogen, converting iron sulfide on the catalyst to hydrogen sulfide, and regenerating the catalyst. These towers are equipped with a cyclone, a line having nozzles to supply the feed oil and the catalyst, an outlet for the reaction product, conduits through which solid particles are circulated from tower to tower and, if necessary, heat-recovering or heat-supplying equipment.

A pre-heated feed oil such as an atmospheric residual oil, a vacuum residual oil, a solvent-deasphalting residual oil, a shale oil, a liquefied coal oil, or tar sand is fed into tower 1 through feed nozzle 4 provided at the lower portion of tower 1, and is brought into contact with the catalyst fluidized by a fluidizing gas introduced through pipe 11, to convert the heavy oil to cracked gas and cracked distillate and deposit coke on the catalyst. Cracked gas and converted cracked distillate thus produced are recovered from the top portion 12 of the first tower 1.

On the other hand, the gaseous sulfur compounds produced upon cracking a heavy sulfur-containing oil are fixed as iron sulfide through reaction with the reduced iron in the reduced catalyst which is introduced via transfer pipe 7 from second tower 2, whereas other sulfur compounds are deposited on the catalyst together with the coke. Therefore, the cracked gas and the converted cracked distillate recovered from top 12 of the first tower 1 contain low amounts of sulfur. The above-described catalytic cracking is conducted at temperatures of about 450° to 600° C. and under a pressure of about 0 to 15 kg/cm$^2$ G. As the fluidizing gas, a hydrocarbon gas such as the cracked gas from top 12 of the first tower 1 is usually used. Nitrogen gas and steam are also useful.

The catalyst having deposited thereon sulfur-containing coke produced in the first tower is then transferred to the second tower 2 via transfer pipe 5, and the air is introduced thereinto through nozzle 6 provided at the bottom of the second tower while controlling the molar ratio of $O_2$/C within the tower to about 0.2 to 0.6 to thereby partially combust the above-described coke and at the same time, reduce any iron in a higher oxidation state. In the combustion of the coke deposited on the catalyst, sulfur compounds in the coke are converted into gaseous sulfur compounds such as hydrogen sulfide, sulfurous acid gas, carbonyl sulfide, etc., which are instantly captured by the above-described reduced iron and fixed as iron sulfide. Therefore, gas discharged from the top 13 of the second tower contains sulfur compounds like $H_2S$ and $SO_2$ in extremely small amounts, e.g., about 200 ppm or less.

The heat generated by partial combustion of coke in the second tower compensates for the heat consumed in the first and third towers. Introduction of another fuel such as the feed oil or cokes into the second tower makes the whole operation more flexible because the quantity of heat produced and/or the reduction rate in the second tower are increased. That is, when the quantity of heat produced and/or the reduction rate in the second tower is increased, the amount or reduction rate of the catalyst circulated to the first tower and/or the third tower can be increased, which enables an increase in the amount of the feed oil to the first tower and an increase in the amounts of the cracked gas and the converted cracked distillate, and/or enables an increase in the amount of hydrogen produced in the third tower. Usually, it is more economical to increase the amount or reduction rate of the catalyst circulated to the third tower to thereby increase the amount of hydrogen produced there. This means that the amount of hydrogen can be adjusted according to the market demand by merely controlling the auxiliary fuel to the second tower regardless of the amount of deposited coke in the first tower. Thus, this process can be operated extremely flexibly.

The second tower is operated at a temperature of about 700° to 900° C. and under a pressure of about 0 to 15 kg/cm$^2$ G. If the temperature is lower than about 700° C., the catalyst is hard to be reduced and heat supply to other towers becomes insufficient, whereas if it is higher than about 900° C., bogging of the catalyst results.

Part of the reduced catalyst thus produced in the second tower is circulated to the first tower via transfer pipe 7 so as to capture part of the sulfur compounds produced by catalytic cracking in the first tower with reduced iron. On the other hand, at least part of the reduced catalyst produced in the second tower is transferred to the third tower 3 via transfer pipe 8, and is contacted with steam introduced thereinto through nozzle 9 provided at the bottom of the tower to produce hydrogen, convert the reduced iron in the catalyst to iron oxides, and decompose the iron sulfide fixed on the catalyst to $H_2S$. The reaction temperature and the pressure within the above-described third tower are maintained at about 600° to 850° C. and about 0 to 15 kg/cm$^2$G, respectively. Needless to say, if the temperature within this third tower becomes too high, the temperature can be controlled by introducing water in place of steam utilizing the latent heat of vaporization.

The oxidized catalyst obtained in the third tower 3 is circulated to the second tower 2 via transfer pipe 10 to be reduced in the second tower 2. Additionally, hydrogen produced in the third tower is mainly produced by the oxidation-reduction reaction between the reduced iron and steam but not by the reaction between the coke and steam, and hence the concentrations of CO and $CO_2$ are low and the purity of hydrogen is usually as high as 80 volume % or more based (dry). This hyrogen is fed from the top portion 14 of the third tower to hydrogen-purifying equipment for recovery. Most of the gaseous products produced by decomposition of iron sulfide in the third tower is hydrogen sulfide and is discharged as highly concentrated hydrogen sulfide, which can be extremely easily recovered by means of an amine-absorbing apparatus or the like.

As described above, in the present invention, sulfur compounds are discharged as hydrogen sulfide in a high content together with hydrogen in processing a sulfur-containing heavy oil to cracked distillate, and hence they can be recovered easily. Further, since the exhaust gas in a large quantity does not substantially contain sulfur dioxide discharged, it is not necessary to provide a desulfurization apparatus for the exhaust gas. Such is, therefore, quite advantageous on an industrial scale. Further, the contents of the sulfur compounds in the cracked distillate can be reduced so much that the amount of hydrogen consumed in the subsequent desulfurizing apparatus can be reduced. Thus, the process of this invention is extremely advantageous for industrial practice.

The present invention will now be described in more detail by reference to Example and Comparative Example.

EXAMPLE

The process of the present invention was conducted using the apparatus comprising the three towers arranged as illustrated in the Figure.

Specifications of the towers:

First tower:
stainless steel-made tower 12.7 cm in diameter and 1.6 m in height.

Second tower:
stainless steel-made tower 15.1 cm in diameter and 1.8 m in height.

Third tower:
stainless steel-made tower 10.2 cm in diameter and 1.9 m in height.

Properties of feed oil:
Kuwait-yielded vacuum residual oil.
Specific gravity: 1.04
Conradson's carbon: 24.6 wt %
Sulfur Content: 5.49 wt %

Properties of catalyst:
Prepared by finely pulverizing, grinding, and granulating natural laterite ores into a spherical shape to adjust the particle size to 70 to 400μ, then calcining at 1,160° C. fo 3 hours. Composition of the catalyst was as follows.

| | | (wt %) | | |
|---|---|---|---|---|
| Fe | Ni | $Al_2O_3$ | MgO | $SiO_2$ |
| 49.7 | 1.44 | 2.85 | 5.54 | 8.61 |

Operation conditions:

The above-described catalyst was placed in the first, second, and third towers in amounts of 10 kg, 11 kg, and 11 kg, respectively. The temperature of each tower was raised to 400° C. while introducing thereinto air as a fluidized bed-forming gas to form a fluidized catalyst bed and, at this stage, the gas introduced into the first tower was changed to a nitrogen gas, and the gas into the third tower was changed to steam. Then, the above-described feed oil pre-heated to 200° C. was fed through the inlet provided at the bottom of the first tower at a rate of about 4.0 kg/hr. Subsequently, the amount of the catalyst circulated between the first tower and the second tower was controlled to 32 kg/hr, and that between the second tower and the third tower was controlled to 16 kg/hr. Reaction temperatures in the respective towers were as follows.

First tower: 538° C.
Second tower: 828° C.
Third tower: 728° C.

Twenty hours after starting operation, products of the respective towers were sampled by means of a receiver or through a proper position on piping to analyze.

Results of the analysis were as follows.

Yields of the products from the first tower:

| | |
|---|---|
| Cracked gas | 9 wt % |
| Converted cracked distillate | 66 wt % |
| Coke | 25 wt % |

Composition of the outlet gas from the second tower:

| | |
|---|---|
| $N_2$: | 73.7 mol % |
| CO: | 8.7 mol % |
| $CO_2$: | 9.2 mol % |
| $CH_4$: | 0.6 mol % |
| $H_2$: | 2.6 mol % |
| $SO_2$: | 30 ppm |
| $H_2S$: | 150 ppm |
| NO: | trace |

The amount of outlet gas from the third tower was 950 N l/hr (based on dry gas), and $H_2$ concentration and $H_2S$ concentration in the gas were 84.6 mol % and 8.2 mol %, respectively.

Also, as a result of conducting the same operations as described above except for introducing the same feed oil as described above into the second tower at the rate of 0.12 kg/hr as an auxiliary fuel and changing the amount of catalyst circulated between the second tower and the third tower to 16.5 kg/hr, the amount of outlet gas from the third tower was found to be 1,064 N l/hr (based on dry gas), with the $H_2$ concentration in the gas being 83.2 mol %, and the $H_2S$ concentration in the gas being 7.9 mol %.

Further, as a result of conducting the same operations as described above except for changing the amount of the above-described auxiliary fuel introduced into the second tower to 0.28 kg/hr or 0.44 kg/hr and correspondingly changing the amount of catalyst to circulate between the second tower and the third tower to 18.5 kg/hr or 20.5 kg/hr, the amount of the outlet gas from the third tower was found to be 1,163 N l/hr or 1,320 N l/hr (based on dry gas), with the hydrogen concentration in the gas being 85.3 mol %, or 83.3 mol %, and the hydrogen sulfide concentration in the gas being 7.5 mol % or 7.8 mol %.

COMPARATIVE EXAMPLE

Procedures described in Example were followed using the same catalyst and the same feed oil as in Example except for operating the second tower under completely oxidizing conditions. The operation results were different from that in Example in the following points.

The hydrogen sulfide concentration in the cracked gas produced in the first tower was 5.0 mol %, and $SO_2$ concentration and NO concentration in the outlet gas from the second tower were 5,500 ppm and 170 ppm, respectively. Naturally, no hydrogen-containing gas was produced from the third tower.

While the invention has been described in detail and with reference to specific embodiments thereof, it will be apparent to one skilled in the art that various changes and modifications can be made therein without departing from the spirit and scope thereof.

What is claimed is:

1. A process for processing a sulfur-containing heavy oil, which comprises:
   in a first zone, catalytically cracking a sulfur-containing heavy oil in a fluidized manner in the presence of reduced-state catalyst particles containing about 30 to 60 wt % Fe to thereby convert the heavy oil to a light oil, depositing sulfur-containing coke on the catalyst particles, and partially fixing the decomposed sulfur compounds with reduced iron contained in the catalyst particles as iron sulfide;

in a second zone, contacting the catalyst from the first zone with an oxygen containing gas in an amount less than that theoretically required to thereby partially combust the coke on the catalyst, reduce the iron in the catalyst, and fix the sulfur compounds contained in the coke as iron sulfide; and in a third zone, contacting the reduced-state catalyst from the second zone with steam in a fluidized manner to produce hydrogen and hydrogen sulfide and to convert the reduced iron and iron sulfide in the catalyst to iron oxides, with the iron oxide-containing catalyst obtained in the third zone being recirculated into the second zone to be reduced and a part of the reduced-state catalyst obtained in the second zone being recirculated into the first zone.

2. The process of claim 1, wherein said catalyst containing about 30 to 60 wt % Fe comprises a combination of two or more iron compounds or natural iron ores and/or an inorganic refractory material and is prepared by pulverizing, granulating, and then calcining.

3. The process of claim 2, wherein said iron compound is iron chloride, iron oxide, iron sulfate or iron carbonate.

4. The process of claim 2, wherein said natural iron ore is laterite, siderite, magnetite, hematite or limonite.

5. The process of claim 1, wherein the reaction in the first zone is conducted at a temperature of about 450° to 600° C. and under a pressure of about 0 to 15 kg/cm$^2$ G.

6. The process of claim 1, wherein the reaction in the second zone is conducted at a temperature of about 700° to 900° C. and under a pressure of about 0 to 15 kg/cm$^2$ G.

7. The process of claim 1, wherein the reaction in the third zone is conducted at a temperature of about 600° to 850° C. and under a pressure of about 0 to 15 kg/cm$^2$ G.

8. The process of claim 1, wherein an auxiliary fuel is introduced in the second zone, while controlling the amount of the auxiliary fuel to adjust the amount of hydrogen generated in the third zone.

9. The process of claims 1 or 8, wherein the amount of oxygen introduced in the second zone is about 0.2 to 0.6 mol per mol of carbon introduced in the second zone.

10. The process of claim 1, wherein the amount of steam introduced in the third zone is about 3 mols or more per mol of iron sulfide introduced in the third zone.

11. A process for processing a sulfur-containing heavy oil, as claimed in claim 1, wherein said sulfur-containing coke is deposited on the catalyst in an amount of about 2 to 8% by weight based on the weight of the catalyst, and further wherein a major portion of the iron oxide-containing catalyst obtained in the third zone is recirculated to the second zone to be reduced and wherein a major portion of the reduced-state catalyst obtained in the second zone is recirculated to the first zone.

* * * * *